June 29, 1943.   T. N. SMITH   2,323,251
VALVE OPERATING MECHANISM
Filed Oct. 1, 1941

Inventor
Thomas Noah Smith,
By Stone, Boyden & Mack,
Attorneys

Patented June 29, 1943

2,323,251

UNITED STATES PATENT OFFICE 2,323,251

VALVE OPERATING MECHANISM

Thomas Noah Smith, San Antonio, Tex.

Application October 1, 1941, Serial No. 413,198

5 Claims. (Cl. 123—79)

This invention relates to internal combustion engines and more particularly to an improved construction of valve operating mechanism for such engines.

Such engines as commonly constructed comprise poppet valves operated by means of cams upon a cam shaft. In many cases, these cams wipe directly upon the ends of the valve stems, with the result that friction produces a lateral strain on such stems which causes undue wear of the same or of the guides in which they reciprocate.

The general object of the present invention is to provide an improved construction, involving anti-friction means interposed between the cam and valve stem, so that the valve stem will be relieved of substantially all lateral pressure and will operate more efficiently and smoothly.

With the above and other specific objects in view, the invention consists in the construction, combination and arrangement of parts hereinafter described and claimed and illustrated in the accompanying drawing, in which—

Figure 1:
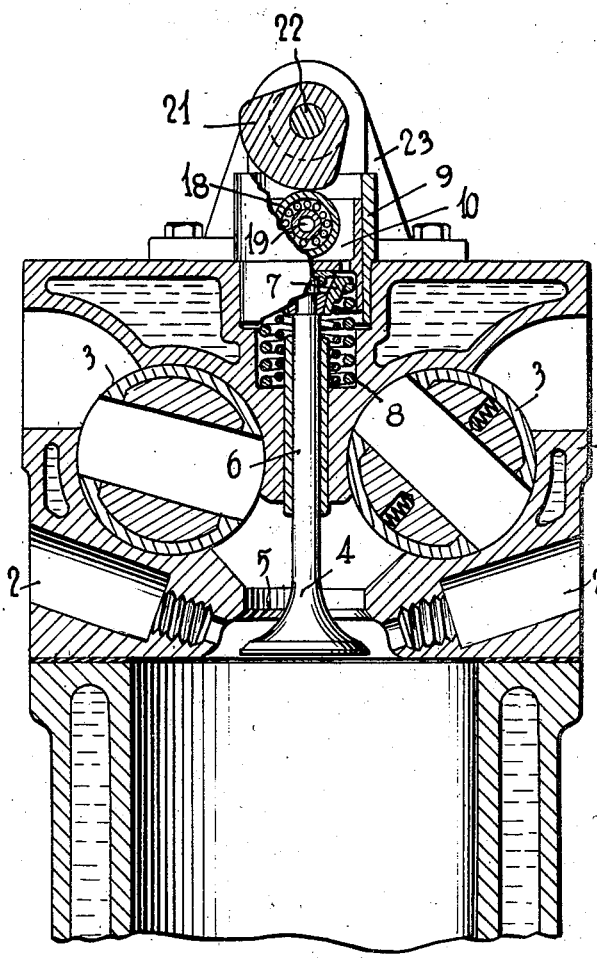
Fig. 1 is a fragmentary transverse section through the cylinder head of an engine embodying my improved valve operating mechanism.

While my improved valve operating mechanism is applicable to engines of many different types, it is illustrated, by way of example, as applied to an engine of the general type shown in my prior Patent No. 2,048,826, dated July 28, 1936, such engine comprising a pair of rotary valves and one or more poppet valves interposed between such rotary valves and each cylinder.

Referring to the drawing in detail, I designates the cylinder head, having spark plug sockets 2 and rotary valves 3. Between these rotary valves and each engine cylinder is a poppet valve 4 having a stem 6 and adapted to close against a seat 5.

A suitable washer 7 is secured to the upper end of the valve stem 6 in any desired manner, and against this washer bear one or more helical springs 8, surrounding the valve stem and housed in a pocket in the cylinder head in a well known manner. The arrangement so far described forms no part of my present invention.

My improved valve operating mechanism comprises a guide sleeve 9 set at one end into a socket in the cylinder head concentric with the springs 8, and projecting above the cylinder head to a point adjacent the cam shaft.

Figure 2:
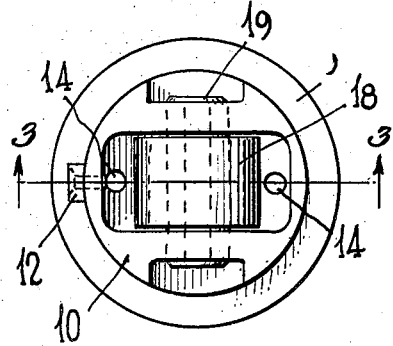
Fig. 2 is a plan view on an enlarged scale of my improved mechanism, the cam and cam shaft being omitted.
Figure 3:
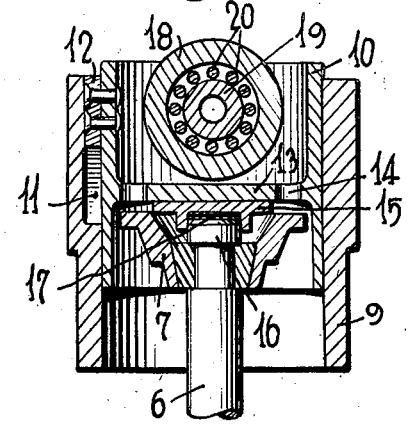
Fig. 3 is a longitudinal section substantially on the line 3—3 of Fig. 2.

Mounted to reciprocate within the guide sleeve 9 is a piston block 10, the details of which are best shown in Figs. 2 and 3. This block, as illustrated, is cylindrical in shape, and in order to prevent angular displacement of the same within the guide sleeve, such sleeve is formed with a groove or keyway 11 in which freely slides a lug or key 12 secured as by riveting to the block 10. In any event, the block is of uniform diameter, and engages the guide sleeve throughout its length.

The piston or block 10 is hollow and has a transverse partition 13 dividing it into two chambers. In the lower chamber is received the upper end of the valve stem 6 including the washer 7 and springs 8, and interposed between the partition 13 and the valve stem is a shim holder 15, having a central recess into which the end 16 of the valve stem fits. Into this recess, I place any desired number of shim disks 17, so as to adjust, as required, the distance between the partition 13 and the upper end of the valve stem, or in other words, regulate the clearance of the valve. The partition 13 has one or more vent openings 14 therethrough.

In the upper chamber or pocket is mounted a roller 18, journalled on a shaft or pin 19 set into the block, such roller being shown as having antifriction bearings 20 interposed between itself and the pin 19, so as to permit the roller to turn easily and freely. It will be noted that the pin 19 is well below the upper end of the block, so that the block provides bearing surfaces both above and below this pin.

Referring again to Fig. 1, it will be seen that a cam shaft 22 is journalled in brackets 23 secured to the cylinder head, and on this cam shaft are secured the requisite number of cams 21 having any desired contour. It will be noted that the pin 19 is parallel with the cam shaft 22, and this parallelism is maintained by reason of the key 12. It will also be seen that the cam extends down into said guide sleeve.

In operation, the springs 8 exert an upward pressure on the block 10 and urge the roller 18 into engagement with the cam 21. As the cam rotates, its surface rides easily upon the roller 18, substantially without friction, and this relieves the valve mechanism of serious side thrust or lateral strain. Any side thrust produced is sustained directly by the guide 9, both above and below the axis of the roller. Moreover, the piston block 10 is relatively long, so as to afford an extended bearing within the guide sleeve 9. Thus, the parts are maintained in accurate alignment at all times, and wear is reduced to a minimum.

In the particular embodiment illustrated in the drawing, the cam 21 has a relatively long face, because of the necessity of maintaining the poppet valve open while the rotary valves 3 are turning through the proper angle, as in my above mentioned prior patent. It will, of course, be understood, however, that where my improved valve operating mechanism is used with other types of engines, not employing rotary valves, the shape of the cam may be entirely different, as for example, provided with a short face and sharply inclined sides. Such a sharp narrow-faced cam tends to produce side thrust to a greater extent than the type of cam illustrated, and in connection with such a cam, my improved construction is even more desirable for the purpose of preventing side thrust.

I claim:

1. The combination with a cylinder head, of a poppet valve mounted for reciprocation therein, and having a stem, a cylindrical guide sleeve set into said head, a block slidable in said guide sleeve, and a cam shaft having a cam extending into said guide, said block constructed to engage said valve stem and also having means to engage said cam.

2. The combination with a cylinder head, of a poppet valve mounted for reciprocation therein, and having a stem, a spring surrounding said stem, a spring engaging washer secured to said stem, a cylindrical guide sleeve separate from said head, set into said head and projecting beyond the same, a block slidable in said guide sleeve, and a cam shaft having a cam adjacent to and extending into the end of said guide sleeve, said block having means to engage said cam and also having a portion adapted to actuate said valve stem.

3. The combination with a cylinder head, of a poppet valve mounted for reciprocation therein, and having a stem, a cylindrical guide sleeve set into said head, a block slidable throughout its length in said guide sleeve and adapted to engage said valve stem, said block having a pocket at its end, a cam shaft having a cam, and a roller mounted in said pocket and positioned to be engaged by said cam, said block extending both above and below the axis of said roller.

4. The combination with a cylinder head, of a poppet valve mounted for reciprocation therein, and having a stem, a cylindrical guide sleeve set into said head, a block slidable throughout its length in contact with said guide sleeve and adapted to engage said valve stem, said block having chambers adjacent its two ends, one of said chambers being constructed to receive the end of said valve stem and a roller mounted in the other chamber, and a cam shaft having a cam adapted to engage said roller.

5. In an internal combustion engine, the combination with a poppet valve having a stem and a cam shaft having a cam, of means interposed between said valve stem and cam whereby the latter may actuate the former, said means comprising a guide sleeve, a block in slidable engagement throughout its length with said sleeve and also engaging said valve stem, and a roller mounted on a transverse axis in said block in position to be engaged by said cam, said block extending longitudinally on both sides of said axis.

THOMAS NOAH SMITH.